No. 891,636. PATENTED JUNE 23, 1908.
T. SANDERA.
POWER TRANSMISSION MECHANISM.
APPLICATION FILED DEC. 19, 1907.

2 SHEETS—SHEET 1.

Witnesses
Harry O. Rostetter
Mary A. Cavanaugh

Inventor
Theodore Sandera
By Harry Frease
Attorney

No. 891,636. PATENTED JUNE 23, 1908.
T. SANDERA.
POWER TRANSMISSION MECHANISM.
APPLICATION FILED DEC. 19, 1907.

2 SHEETS—SHEET 2.

Witnesses
Inventor
Theodore Sandera
By Harry Frease
Attorney.

UNITED STATES PATENT OFFICE.

THEODORE SANDERA, OF CANTON, OHIO.

POWER-TRANSMISSION MECHANISM.

No. 891,636. Specification of Letters Patent. Patented June 23, 1908.

Application filed December 19, 1907. Serial No. 407,106.

*To all whom it may concern:*

Be it known that I, THEODORE SANDERA, a citizen of the United States, residing at Canton, in the county of Stark and State of Ohio, have invented a new and useful Improvement in Power - Transmission Mechanism, of which the following is a specification.

The invention relates to a mechanism for transmitting power as from a belt by means of a free roller; and the objects of the improvement include the utilization of the weight and momentum of the roller to supplement and steady the power transmitted through the belt, and also the utilization of the free roller as an automatic belt tightener. These objects and other advantages are attained by the construction, mechanism and arrangement illustrated in the accompanying drawings, in which—

Figure 2:
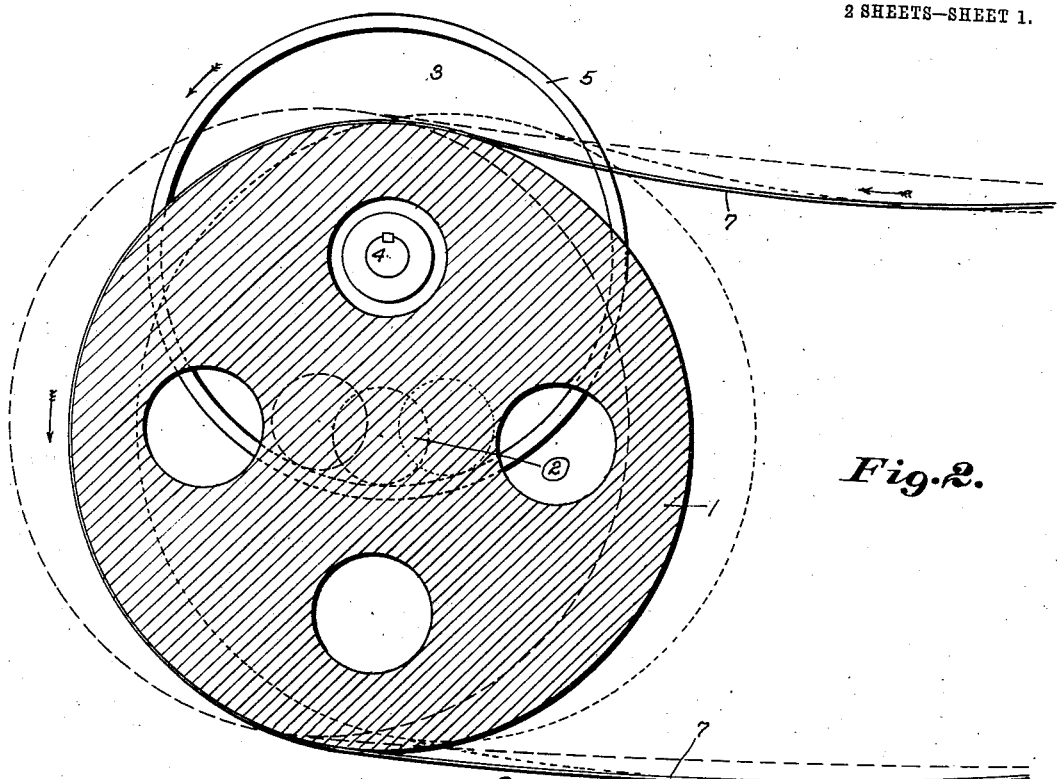
Figure 1:
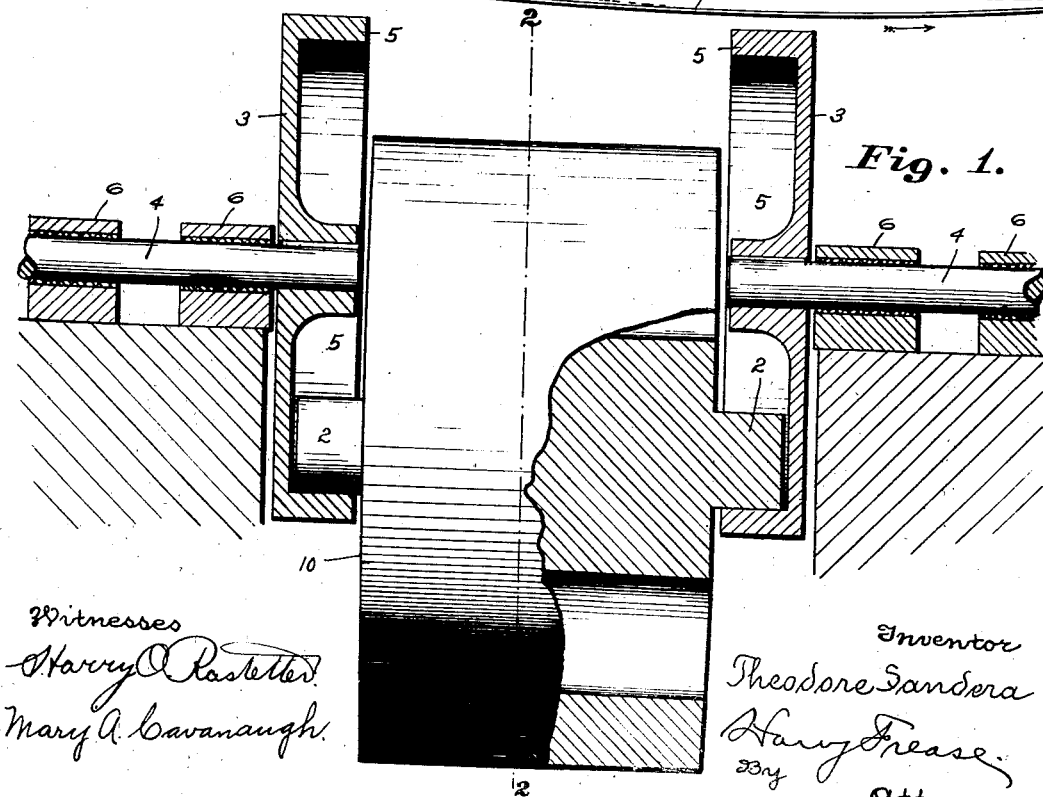
Figure 4:
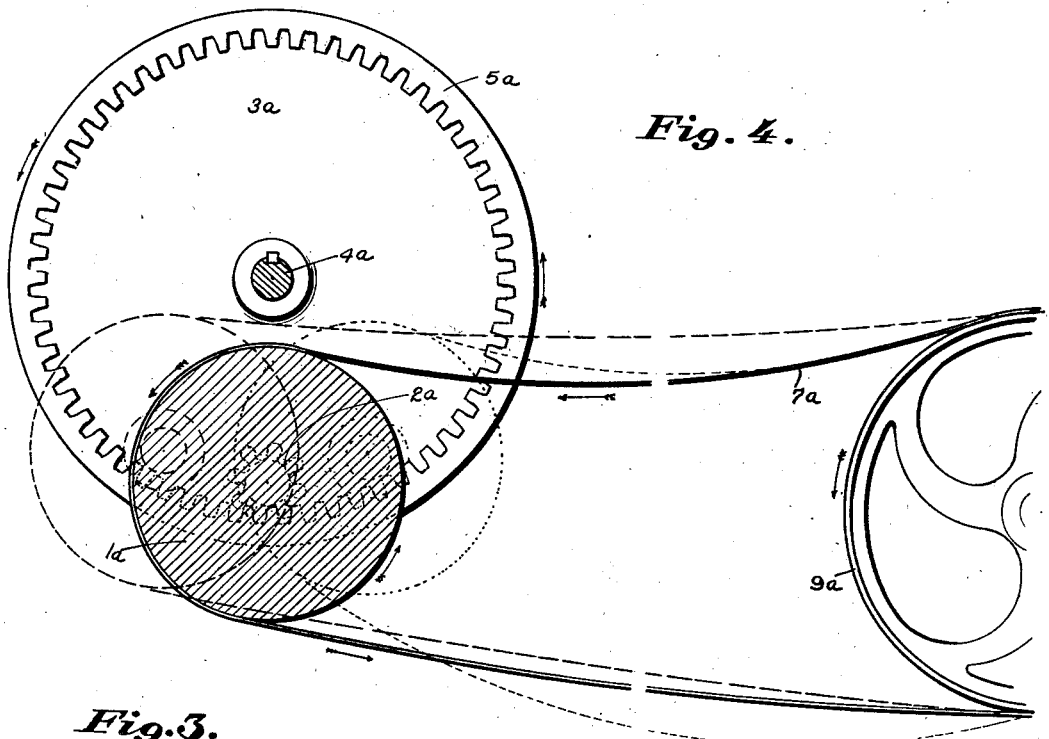
Figure 3:
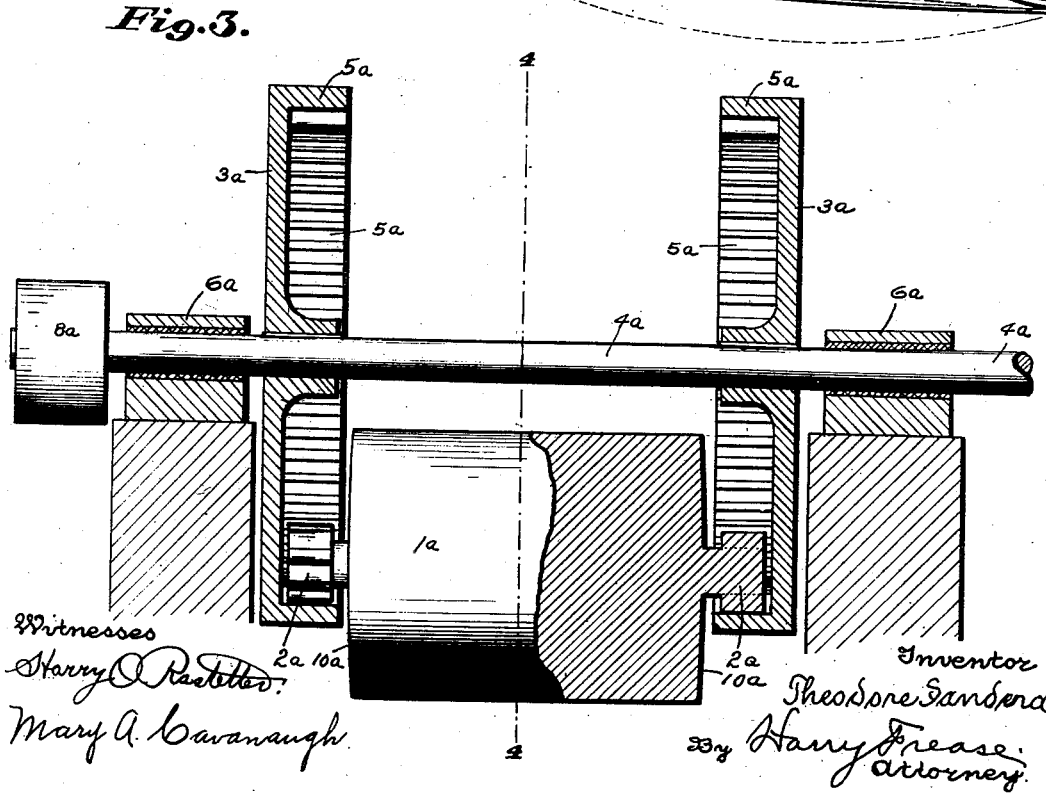

Figure 1 is a vertical-axial section of the simple form of the mechanism, showing the free roller partly in side elevation; Fig. 2, a cross section of the same on line 2—2, Fig. 1, with a belt on the roller; Fig. 3, a vertical-axial section of a geared form of the mechanism, showing the free roller partly in side elevation; and Fig. 4, a cross section of the same on line 4—4, Fig. 3, with a belt and driving pulley geared to the roller.

Similar numerals refer to similar parts throughout the drawings.

The most simple form of the invention is illustrated in Sheet 1 of the drawings, in which the free roller 1 is provided with the plain axles or trunnions 2 on each side. The driven wheels 3 are secured on co-axial shafts 4 on each side of the free roller and these wheels are provided with the peripheral cylindric flanges 5, on the inner sides of which flanges the trunnions of the roller are supported and adapted to operate. The shafts in turn are journaled in suitable bearings, as 6.
When the belt 7 is operated by a driving pulley, not shown on Sheet 1, the free roller is rotated, preferably in the direction shown by the arrows. The rolling of the trunnions on the peripheral flanges of the driven wheels causes the same to rotate, thus communicating the power to the shaft 4, from which it is transmitted by suitable gearing in the usual manner. The weight of the free roller which is entirely supported on the peripheral flanges, serves to increase the frictional contact of the trunnions on the flanges, so that a considerable amount of power can be transmitted by this simple form of the mechanism.

It is evident that the resistance of the load on the driven wheels, that is the work performed by them, will cause the free roller to move forward to a position as indicated by broken lines in Fig. 2. This forward movement of the free roller will not only serve to automatically tighten the belt, but as the roller trunnions travel upward on the flanges of the driven wheels, the weight of the roller will serve to accelerate the motion of the wheels. And conversely, if for any reason the initial power should be lessened, the momentum of the driven machinery will carry the roller backward to a position as indicated by dotted lines in Fig. 2, and the tension of the belt will be lessened and the weight of the roller will serve to retard the movement of the driven wheels. The free roller thus not only acts as an automatic belt tightener but serves to steady the motion of the driven machinery. The travel of the plain trunnions on the peripheral-flanges is practically noiseless, so that this form of the mechanism runs very quietly.

A form of the invention in which a cog-gearing is employed to make positive the action of the free pulley on the driven wheels is illustrated in Sheet 2 of the drawings. The free pulley 1$^a$ is provided with the axial trunnions 2$^a$ in the form of cog-pinions, and the driven wheels 3$^a$ have the peripheral-flanges 5$^a$ in the form of internal-annular cog-gears, in which gears the cog-pinions are adapted to mesh and operate. In Sheet 2 the driven wheels are shown as secured on the through shaft 4$^a$, which is journaled in the bearings 6$^a$, and from which power is taken as by the ordinary pulley 8$^a$. In this form of the mechanism, the diameter of the free roller is limited to approximately one half of the diameter of the driven wheels, because of the presence of the through shaft between the driven wheels. The free roller 1$^a$ is driven, as before, by the belt 7$^a$ from a driving pulley as 9$^a$, and the operation of the mechanism is substantially the same as described for the simple form, excepting that there can be no slipping of the trunnions, in this case the cog-pinions of the free roller, on the peripheral flanges, in this case the internal-annular cog-gears, of the driven wheels. In both forms of the mechanism the ends 10 and 10$^a$ of the free roller are preferably crowned or convexly rounded, so that the edges will not interfere with the driven wheels; but it will be understood that under the well known law of rotating bodies, there will be no tendency for the axis of the free roller to shift from its position of parallelism with reference to the axis of the driven wheels.

By supporting the driven roller at the periphery of the driven wheels, free of any journal bearings, full advantage is taken of the weight and momentum of the roller and of all the peculiar laws which govern a freely rotating cylinder; and for the purpose of increasing the weight of the free pulley it is preferably made substantially in the form of a solid cylinder, which same can be lightened by cavities as may be desired.

What I claim as my invention and desire to secure by Letters Patent, is—

1. A mechanism for transmitting power comprising a pair of wheels having annular flanges and being co-axially journaled opposite each other, and a free roller having axial trunnions on its ends adapted to be supported entirely on the flanges and to roll freely thereon.

2. A mechanism for transmitting power comprising a pair of wheels having annular flanges and being co-axially journaled opposite each other, and a free roller having axial trunnions on its ends adapted to be supported entirely on the flanges and to rotate freely thereon, with means for operating the roller.

3. A mechanism for transmitting power comprising a pair of wheels having annular flanges and being co-axially journaled opposite each other, and a free roller having axial trunnions on its ends adapted to be supported entirely on the flanges and to rotate freely thereon, with an adjacent driving pulley and a belt on the roller and pulley.

4. A mechanism for transmitting power comprising a pair of wheels co-axially journaled opposite each other and having internal-annular cog-gears thereon, and a free roller having axial cog-trunnions on its ends adapted to be supported entirely on the cog-gears and adapted to roll freely thereon.

5. A mechanism for transmitting power comprising a pair of wheels co-axially journaled opposite each other and having internal-annular cog-gears thereon, and a free roller having axial cog-trunnions on its ends adapted to be supported entirely on the cog-gears and adapted to roll freely thereon, with means for rotating the roller.

6. A mechanism for transmitting power comprising a pair of wheels co-axially journaled opposite each other and having internal-annular cog-gears thereon, and a free roller having axial cog-trunnions on its ends adapted to be supported entirely on the cog-gears and adapted to roll freely thereon, with an adjacent driving pulley and a belt on the roller and pulley.

THEODORE SANDERA

Witnesses:
ETHEL SANDERA,
MARY A. CAVANAUGH.